US010298660B2

(12) United States Patent
Takahashi et al.

(10) Patent No.: US 10,298,660 B2
(45) Date of Patent: May 21, 2019

(54) INFORMATION SYSTEM AND MULTI-FUNCTIONAL INFORMATION DEVICE

(71) Applicant: Konica Minolta, Inc., Tokyo (JP)

(72) Inventors: Kazusei Takahashi, Hyogo (JP); Junichi Hase, Osaka (JP); Kenji Matsuhara, Hyogo (JP); Kazuya Anezaki, Hyogo (JP); Hirokazu Kubota, Shiga (JP)

(73) Assignee: Konica Minolta, Inc., Tokyo (JP)

( * ) Notice: Subject to any disclaimer, the term of this patent is extended or adjusted under 35 U.S.C. 154(b) by 762 days.

(21) Appl. No.: 14/300,052

(22) Filed: Jun. 9, 2014

(65) Prior Publication Data

US 2014/0365655 A1  Dec. 11, 2014

(30) Foreign Application Priority Data

Jun. 10, 2013 (JP) ................................ 2013-122141

(51) Int. Cl.
*G06F 15/16* (2006.01)
*H04L 29/08* (2006.01)

(52) U.S. Cl.
CPC .................................... *H04L 67/10* (2013.01)

(58) Field of Classification Search
CPC ............................. H04L 67/02; H04L 67/125
See application file for complete search history.

(56) References Cited

U.S. PATENT DOCUMENTS

| 6,407,680 | B1 * | 6/2002 | Lai ..................... H04N 7/17318 341/50 |
| 7,124,171 | B1 * | 10/2006 | McCann ........... G06F 17/30103 707/999.2 |
| 7,383,332 | B2 * | 6/2008 | Chong .................... H04L 67/16 709/223 |

(Continued)

FOREIGN PATENT DOCUMENTS

| CN | 101562631 A | 10/2009 |
| CN | 102750324 A | 10/2012 |

(Continued)

OTHER PUBLICATIONS

Patent Abstract of Japan, Publication No. 2007-143186 dated Jun. 7, 2007 (1 page).

(Continued)

*Primary Examiner* — Douglas B Blair
(74) *Attorney, Agent, or Firm* — Osha Liang LLP

(57) ABSTRACT

An information system performing communication with a plurality of cloud servers is provided. The information system includes an information management portion configured to manage account information indicating accounts of a user of the information system, the accounts being set up for the cloud servers; an obtaining portion configured to, in response to operation of logging into the information system by the user, gain access to the cloud servers with the account information to obtain, from each of the cloud servers, usage information indicating use by the user; and a user interface portion configured to cause a display provided in a device operated by the user in order to log into the information system to display a list of the use of each of the cloud servers by the user.

25 Claims, 16 Drawing Sheets

(56) References Cited

U.S. PATENT DOCUMENTS

| | | | |
|---|---|---|---|
| 9,104,858 B1* | 8/2015 | Sundaram | G06F 21/6218 |
| 9,628,471 B1* | 4/2017 | Sundaram | H04L 63/083 |
| 10,168,675 B2* | 1/2019 | Hashimoto | G05B 19/0426 |
| 2003/0051021 A1* | 3/2003 | Hirschfeld | G06F 9/5077 |
| | | | 709/223 |
| 2006/0069665 A1 | 3/2006 | Yamakawa et al. | |
| 2007/0106715 A1* | 5/2007 | Wobbe | H04L 63/029 |
| 2009/0265391 A1 | 10/2009 | Dai et al. | |
| 2010/0332401 A1* | 12/2010 | Prahlad | G06F 17/302 |
| | | | 705/80 |
| 2011/0131335 A1* | 6/2011 | Spaltro | G06F 9/5072 |
| | | | 709/228 |
| 2012/0137002 A1* | 5/2012 | Ferris | G06F 9/5072 |
| | | | 709/226 |
| 2012/0226796 A1* | 9/2012 | Morgan | H04L 12/1453 |
| | | | 709/224 |
| 2012/0293820 A1 | 11/2012 | Mizoguchi et al. | |
| 2013/0067564 A1* | 3/2013 | Fok Ah Chuen | G06F 21/6218 |
| | | | 726/17 |
| 2013/0080905 A1* | 3/2013 | Park | H04N 1/00244 |
| | | | 715/738 |
| 2013/0100477 A1 | 4/2013 | Ozaki | |
| 2013/0227085 A1* | 8/2013 | Choi | H04L 67/02 |
| | | | 709/219 |
| 2013/0238752 A1* | 9/2013 | Park | H04L 67/1097 |
| | | | 709/217 |
| 2014/0059231 A1* | 2/2014 | Choi | H04L 47/70 |
| | | | 709/226 |
| 2014/0115664 A1* | 4/2014 | Boliek | H04L 67/26 |
| | | | 726/3 |
| 2014/0214496 A1* | 7/2014 | Macbeath | G06Q 30/0283 |
| | | | 705/7.37 |
| 2014/0351323 A1* | 11/2014 | Sumida | G06Q 50/10 |
| | | | 709/203 |
| 2014/0351349 A1* | 11/2014 | Irioka | H04L 47/70 |
| | | | 709/206 |
| 2014/0365537 A1 | 12/2014 | Zhao | |
| 2015/0154211 A1* | 6/2015 | Matsubara | H04L 67/42 |
| | | | 707/812 |
| 2015/0363141 A1* | 12/2015 | Fernandes | H04W 4/003 |
| | | | 358/1.15 |

FOREIGN PATENT DOCUMENTS

| | | |
|---|---|---|
| CN | 102789374 A | 11/2012 |
| JP | 2001-184240 A | 7/2001 |
| JP | 2002-288128 A | 10/2002 |
| JP | 2006-92322 A | 4/2006 |
| JP | 2007-143186 A | 6/2007 |
| JP | 2013-092833 A | 5/2013 |

OTHER PUBLICATIONS

Patent Abstract of Japan, Publication No. 2001-184240 dated Jul. 6, 2001 (1 page).

Patent Abstract of Japan, Publication No. 2002-288128 dated Oct. 4, 2002 (1 page).

Office Action dated May 12, 2015, in related Japanese Patent Application No. 2013-122141 (with translation) (8 pages).

Office Action issued in corresponding Chinese Application No. 201410253084.X dated Feb. 13, 2017, and English translation thereof (23 pages).

Office Action issued in corresponding Chinese Application No. 201410253084.X dated Oct. 9, 2017 cited with partial English translation (10 pages).

Office Action issued in corresponding Chinese Application No. 201410253084.X with partial English translation dated Oct. 19, 2018 (24 pages).

Office Action issued in corresponding Chinese Application No. 201410253084.X dated Jul. 31, 2018 with partial English translation (21 pages).

* cited by examiner

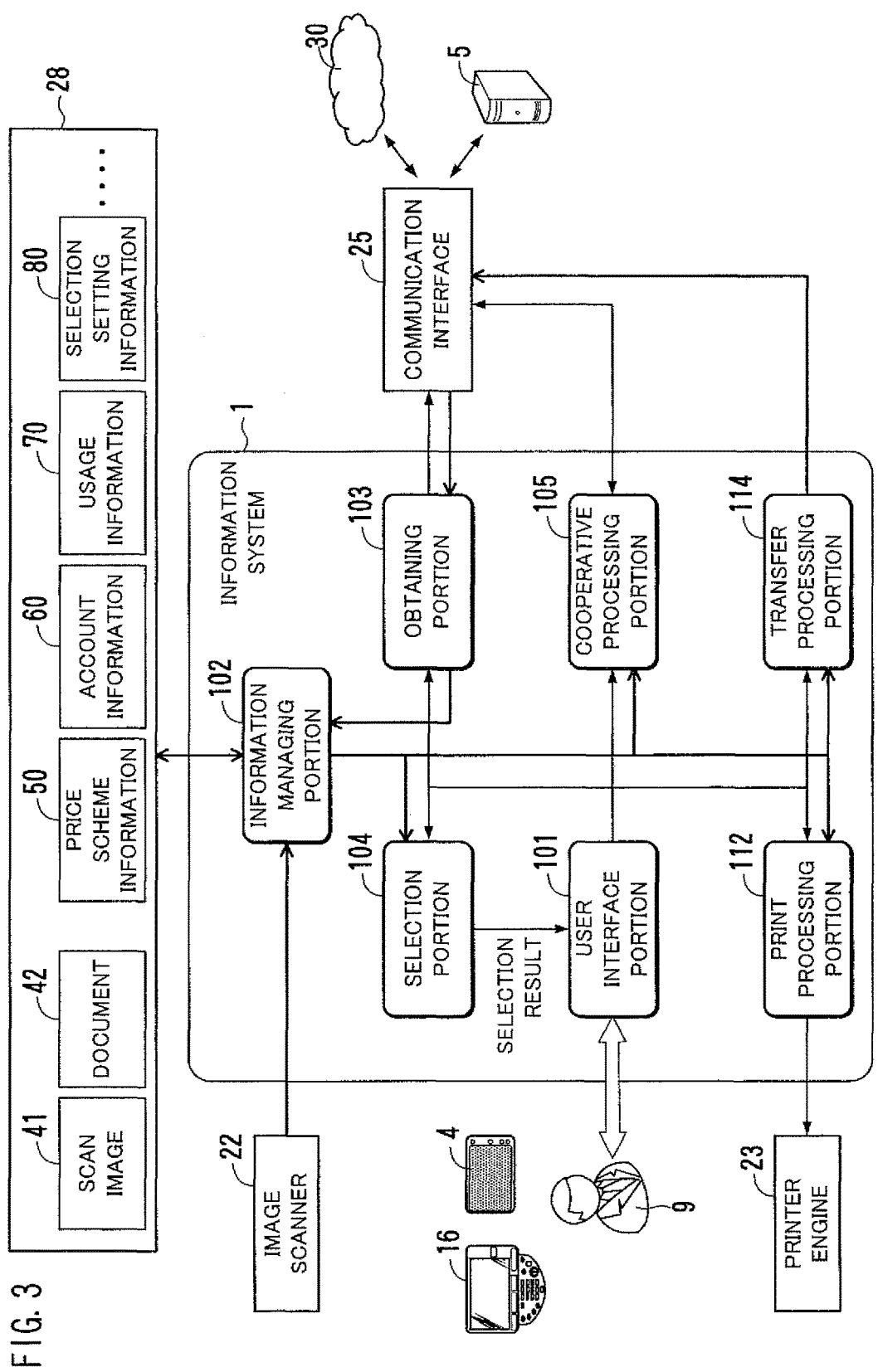

FIG. 4

PRICE INFORMATION T50

| SERVICE NAME | SERVICE CLASS | STORAGE CAPACITY (GB) | MAXIMUM STORAGE (GB) | CHARGE PER USE ||||  BASIC FEE |
|---|---|---|---|---|---|---|---|---|
| | | | | UPLOAD DATA AMOUNT (GB) | DOWNLOAD DATA AMOUNT (GB) | USE PERIOD UNIT (MONTH) | PRICE | |
| CLOUD SERVICE A | DATA SAVE | 5 | 50 | — | — | 1 | JP¥ 100/ MONTH·GB | JP¥ 0 |
| CLOUD SERVICE B | APPLICATION-OFFERING | 1 | 20 | — | 1 | 6 | JP¥ 500/ MONTH·GB | JP¥ 2,000 |
| CLOUD SERVICE C | DATA DELIVERY/ DATA SYNCHRONIZATION | 5 | 30 | — | — | 12 | JP¥ 300 /MONTH·GB | JP¥ 500 |
| CLOUD SERVICE D | SPECIAL | — | — | 1 | — | 3 | JP¥ 800/ MONTH·GB | JP¥ 1,000 |

FIG. 5

| COMMUNICATION SPECIFICATION | | | |
|---|---|---|---|
| ACCESS TARGET | COMMUNICATION SOFTWARE | COMMUNICATION PROTOCOL | STORAGE SUPPORTED FORMAT |
| CLOUD SERVICE A | GENERAL SOFTWARE | GENERAL PROTOCOL (ftp) | All (NO LIMITATION) |
| CLOUD SERVICE B | WEB BROWSER | GENERAL PROTOCOL (http, ftp) | doc, xls, ppt, pdf, jpg, txt |
| CLOUD SERVICE C | WEB BROWSER | GENERAL PROTOCOL (http, ftp) | All (NO LIMITATION) |
| CLOUD SERVICE D | DEDICATED API | DEDICATED PROTOCOL | pdf, jpg, TIFF |

FIG. 6

| COOPERATION PATTERN | | COMMUNICATION PATTERN WITH ANOTHER DEVICE (CLIENT) | | | | | |
|---|---|---|---|---|---|---|---|
| SERVICE NAME | SUPPORTED FORMAT | MFP-BOX | IN-HOUSE SERVER | CLOUD SERVICE A | CLOUD SERVICE B | CLOUD SERVICE C | CLOUD SERVICE D |
| CLOUD SERVICE A | All (NO LIMITATION) | DIRECT | DIRECT | | — | DIRECT | — |
| CLOUD SERVICE B | doc, xls, ppt, pdf, jpg, txt | DIRECT | DIRECT | INDIRECT (MFP-BOX or IN-HOUSE SERVER) | | INDIRECT (MFP-BOX or IN-HOUSE SERVER) | INDIRECT (MFP-BOX or IN-HOUSE SERVER) |
| CLOUD SERVICE C | All (NO LIMITATION) | DIRECT | INDIRECT (MFP-BOX) | INDIRECT (MFP-BOX) | INDIRECT (MFP-BOX) | | INDIRECT (MFP-BOX) |
| CLOUD SERVICE D | pdf, jpg, TIFF | DIRECT | — | INDIRECT (MFP-BOX) | INDIRECT (MFP-BOX) | INDIRECT (MFP-BOX) | |

USER-SPECIFIC ACCOUNT MANAGEMENT TABLE (USER A)

| LOGIN TARGET | ACCOUNT INFORMATION | | DEFAULT DIRECTORY |
|---|---|---|---|
| | USER NAME (ID) | PASSWORD | |
| MFP | misterA | akdubi%7G | ¥misterA |
| IN-HOUSE SERVER | K_misterA | empoynum123 | D:¥user¥k_misterA |
| CLOUD SERVICE A | KM_project_x | bkf45fe&4 | ¥km_project_x¥pub |
| CLOUD SERVICE B | Itami_empnum123 | hsrp4786qxs | ¥domainKM¥employ123 |
| CLOUD SERVICE C | engineer123 | jkeng4786 | ¥KM¥engineer123 |
| CLOUD SERVICE D | Newproj_divENG | 5837ngr64#7 | ¥company66¥newproj_ENG |

USER-SPECIFIC ACCOUNT MANAGEMENT TABLE (USER B)

FIG. 8

| PRIORITY | | | |
|---|---|---|---|
| PRIORITY ITEM | PRIORITY | | |
| | PRIORITY ORDER 1 (TOP PRIORITY) | PRIORITY ORDER 2 | PRIORITY ORDER 3 |
| COST | ✓ | ☐ | ☐ |
| SPEED | ☐ | ✓ | ☐ |
| OTHER (          ) | ☐ | ☐ | ☐ |

| SUPPLEMENTARY INFORMATION T82 | | INFORMATION ON PRIORITY ITEM | | |
|---|---|---|---|---|
| CLOUD NAME | SERVICE CLASS | COST | SPEED | OTHER ( ) |
| CLOUD SERVICE A | DATA SAVE | REFER TO CHARGE-PER-USE TABLE | MIDDLE | ( ) |
| CLOUD SERVICE B | APPLICATION-OFFERING | REFER TO CHARGE-PER-USE TABLE | MIDDLE | ( ) |
| CLOUD SERVICE C | DATA DELIVERY/ DATA SYNCHRONIZATION | REFER TO CHARGE-PER-USE TABLE | MIDDLE | ( ) |
| CLOUD SERVICE D | SPECIAL | REFER TO CHARGE-PER-USE TABLE | MIDDLE | ( ) |

FIG. 10

| OPTION SETTING | | |
|---|---|---|
| PRESENCE/ABSENCE OF NOTICE AND USER INPUT AT TIME OF FILE MOVE | FILE MOVE CANCELABILITY | SELECT |
| FILE MOVE AUTOMATICALLY (NO NOTICE AND NO USER INPUT) | NO | ☐ |
| NOTICE ON SCREEN, NO USER INPUT | NO | ☐ |
| NOTICE ON SCREEN, USER INPUT | YES | ☑ |

T83

INFORMATION SYSTEM AND MULTI-FUNCTIONAL INFORMATION DEVICE

This application is based on Japanese patent application No. 2013-122141 filed on Jun. 10, 2013, the contents of which are hereby incorporated by reference.

BACKGROUND OF THE INVENTION

1. Field of the Invention

The present invention relates to cloud computing.

2. Description of the Related Art

A variety of cloud services such as an online storage is provided on the Internet. In connection with the widespread use of mobile information devices (hereinafter referred to as mobile terminals) such as a tablet PC and a smartphone, the convenience of the cloud services is improved. In recent years, more companies have used such cloud services for business.

Some users use cloud services selectively. For example, a user has accounts for a plurality of online storages. The user uses some of the online storages for documents and the other for photos depending on the type and attribute of data to be saved. The user sometimes uses an online storage and a service of providing software to create and edit a document.

Meanwhile, there has been disclosed a network storage system provided with a plurality of file systems. In a network storage system where a plurality of file systems is provided virtually as a single file system to make file access possible, a switch apparatus for periodically surveying the amount of use of storage resources in the file system is provided, and the use of storage resources in file systems is limited in an integrated manner (Japanese Laid-open Patent Publication No. 2006-092322).

According to conventional technologies, a user who uses different cloud services is required to gain access to each cloud server separately. Therefore, in using each cloud service, the user needs to use account IDs and passwords selectively. For the use of a charge-per-use cloud service, when the user would like to know the current usage fee (charge) of each cloud server, he/she is required to gain access to each cloud server separately. As the user uses more cloud services, so the user's workload increases in order to use the cloud services selectively.

SUMMARY

The present disclosure has been achieved in light of such an issue, and therefore, an object of an embodiment of the present invention is to increase the convenience of a user who uses different cloud services.

According to one aspect of the present invention, an information system performing communication with a plurality of cloud servers, includes an information management portion configured to manage account information indicating accounts of a user of the information system, the accounts being set up for the cloud servers; an obtaining portion configured to, in response to operation of logging into the information system by the user, gain access to the cloud servers with the account information to obtain, from each of the cloud servers, usage information indicating use by the user; and a user interface portion configured to cause a display provided in a device operated by the user in order to log into the information system to display a list of the use of each of the cloud servers by the user.

These and other characteristics and objects of the present invention will become more apparent by the following descriptions of preferred embodiments with reference to drawings.

BRIEF DESCRIPTION OF THE DRAWINGS

FIG. 3 is a diagram showing an example of the functional configuration of an information system.

FIG. 4 is a diagram showing an example of a price information table for managing price schemes of cloud servers in an integrated manner.

FIG. 5 is a diagram showing an example of a communication specification table in which information on communication with cloud servers are centralized.

FIG. 6 is a diagram showing an example of a cooperation pattern table in which mutual communication patterns of cloud servers are centralized.

FIG. 7 is a diagram showing an example of a user-specific account management table in which accounts of cloud servers are managed in an integrated manner.

FIG. 8 is a diagram showing an example of a priority table in which priority items are set in order to select a cloud server recommended a user to use.

FIG. 9 is a diagram showing an example of a supplementary information table prepared for a person who sets priority items.

FIG. 10 is a diagram showing an example of an option setting table used for file move in which at least one cloud server gets involved.

DESCRIPTION OF THE PREFERRED EMBODIMENTS

Figure 1:
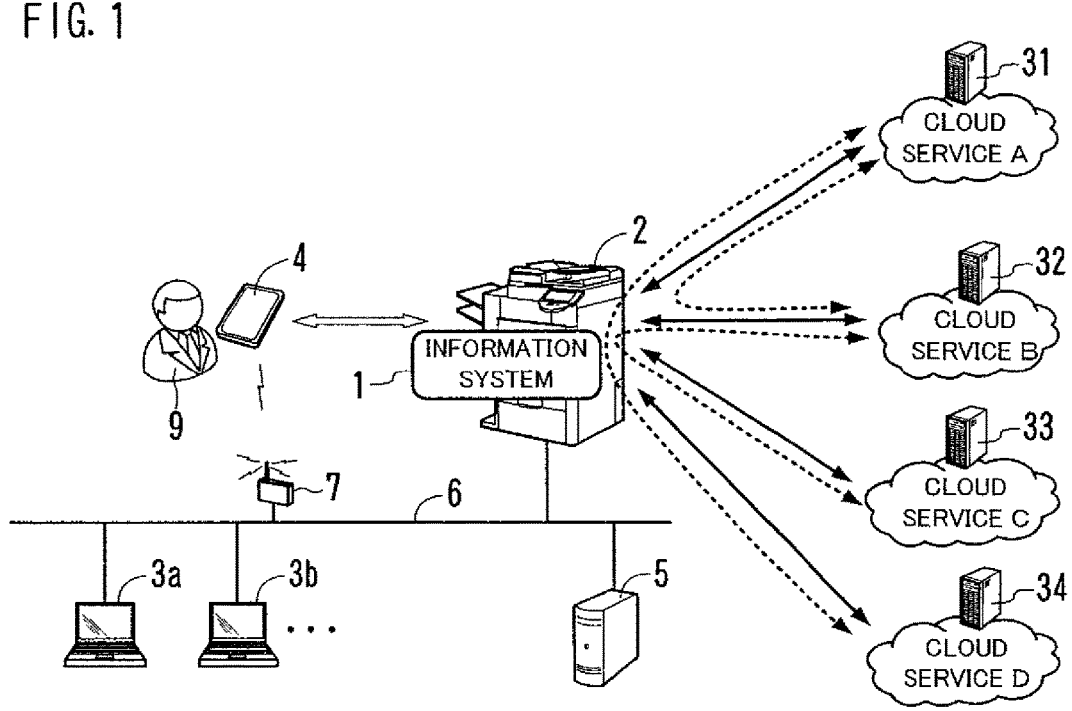
FIG. 1 is a diagram showing an example of a network in which a cloud service is used by using an information system according to an embodiment of the present invention.

Referring to FIG. 1, a Multi-Functional Peripheral (MFP) 2 is provided with an information system 1. The MFP 2 is a multi-functional information device available as a copier, printer, network scanner, facsimile machine, and document server. The MFP 2 is installed in an office of a company, and is connected to a Local Area Network (LAN) 6 constructed in the company office. The MFP 2 is capable of performing communication with devices on the LAN 6 such as personal computers 3a and 3b and a server 5, and also with cloud servers 31, 32, 33, and 34 on the Internet connected to the MFP 2 through the LAN 6. For communication between the MFP 2 and a tablet PC 4 or another mobile terminal, an access point 7 conforming to the Wireless Local Area Network (WLAN) standards is used.

The information system 1 provides a seamless environment that enables employees permitted to use the MFP 2 to easily use different cloud services. FIG. 1 shows an example in which a user 9 (Mr./Ms. AAA) who is an employee of the company uses four cloud services (referred to as "cloud service A", "cloud service B", "cloud service C", and "cloud service D" for the sake of convenience). The four cloud services A, B, C, and D are provided by the cloud servers 31, 32, 33, and 34, respectively.

The information system 1 causes the cloud servers 31, 32, 33, and 34 to execute jobs designated by the user 9. The jobs include: a job of performing processing in which only a single cloud server gets involved (referred to as "independent processing"); and a job of performing processing in which a plurality of cloud servers gets involved (referred to as "cooperative processing"). Examples of the independent processing are uploading a file to a cloud, and causing the MFP 2 to print out a document saved in a cloud. Examples of the cooperative processing are moving a file between cloud servers, and saving a document created in a first cloud server to a second cloud server.

The user 9 gains access to the information system 1 by using an operating panel of the MFP 2, an information device cable-connected to the LAN 6, e.g., the personal computers 3a and 3b, or a mobile information device wirelessly connected to the LAN 6 such as the tablet PC 4. In gaining access to the information system 1 via the LAN 6, the user 9 can obtain, with a Web browser, an operation environment similar to that in the operating panel of the MFP 2 in a device operated by him/her. The user 9 obtains, through a user interface (operating screen) provided by the information system 1, information related to the use of clouds and gives a command to execute a desired job.

Figure 2:
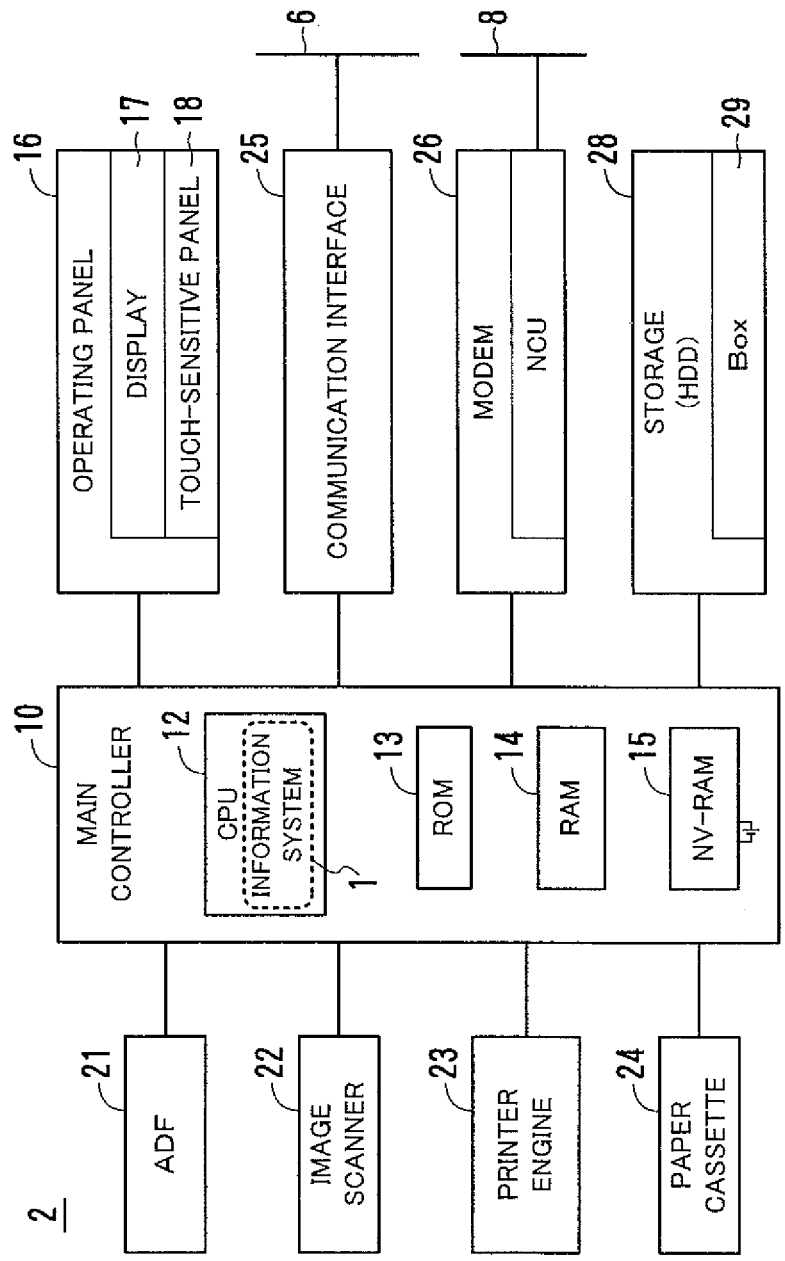
FIG. 2 is a diagram showing an example of the hardware configuration of an information device having an information system.

FIG. 2 shows an example of the hardware configuration of the MFP 2. The MFP 2 is configured of a main controller 10, an operating panel 16, an Auto Document Feeder (ADF) 21, an image scanner 22, a printer engine 23, a communication interface 25, a modem 26, a storage 28, and so on.

The main controller 10 serves to control an overall operation of the MFP 2. The main controller 10 has a Central Processing Unit (CPU) 12 functioning as a computer for executing a variety of programs, a Read Only Memory (ROM) 13 for storing control programs therein, a Random Access Memory (RAM) 14 used as a work area for program execution, a battery-packed Non-Volatile memory (NV-RAM) 15 for storing therein setting data for control, and so on. The CPU 12 functions as the information system 1 in response to execution of a program associated with cooperation between the MFP 2 and a cloud.

The operating panel 16 is provided with a display 17 and a touch-sensitive panel 18. The display 17 is, for example, a liquid crystal panel. The touch-sensitive panel 18 detects a touched position on a display surface of the display 17 and outputs a signal indicating the touched position.

In the case of copying, image input, or facsimile transmission, the ADF 21 feeds a document sheet to a scan position of the image scanner 22. The image scanner 22 optically reads image recorded on the document sheet. The printer engine 23 is operable to print, through electrophotography, a monochrome or color image onto a single side or both sides of paper supplied from a multi-stage paper cassette 24.

The communication interface 25 connects the MFP 2 to the LAN 6. The communication interface 25 is used for communication through the LAN 6, e.g., communication between the MFP 2 and the cloud server 31, 32, 33, or 34. The modem 26 is used for facsimile communication via a public telephone line 8. The modem 26 is provided with a Network Control Unit (NCU).

The storage 28 is a hard disk drive (HDD) or another mass storage device. The storage 28 is used as a medium for storing programs and data for control. The programs and data stored in the storage 28 are loaded, if necessary, into the RAM 14. The storage 28 has a box 29 used as a memory to save a document thereto.

FIG. 3 shows an example of the functional configuration of the information system 1. The information system 1 is configured of a user interface portion 101, an information managing portion 102, an obtaining portion 103, a selection portion 104, a cooperative processing portion 105, a print processing portion 112, a transfer processing portion 114, and so on. These portions are functional elements implemented in response to execution of a predetermined program by the CPU 12 of the main controller 10.

The user interface portion 101 serves to receive/send information with the user 9. The user interface portion 101 displays a predetermined operating screen on a display of a device used for the user 9 to log into the MFP 2, and conveys a command entered by the user 9 with the operating screen to a functional portion which is to respond to the user command. In this example, allowing the user 9 to log into the MFP 2 means allowing the user 9 to log into the information system 1. In the case where the user 9 performs operation through the operating panel 16, the operating screen is displayed on the display of the operating panel 16. In the case where the tablet PC 4 is used for operation, the user interface portion 101 works in coordination with a communication processing portion (not shown) to communicate with the tablet PC 4.

The information managing portion 102 serves to manage information on the use of the cloud services. What is managed by the information managing portion 102 is price scheme information 50, account information 60, usage information 70, selection setting information 80, and so on. The plurality of pieces of information is stored into the storage 28 or the NV-RAM 15.

The price scheme information 50 shows pricing of each of the cloud services (cloud servers) used by users, including the user 9, of the information system 1. The price scheme information 50 is registered, for example, by an administrator of the MFP 2 based on information provided by service providers managing the cloud servers.

The account information 60 shows user accounts for cloud servers given to the users of the information system 1. The account information 60 is updated every time when each user is given a new account, or the number of users is increased or decreased.

The usage information 70 shows use of the cloud servers by the user registered in the account information 60. The use herein means the latest use indicated in information provided by the cloud servers. The information includes, for example, the amount of data saved (or available storage amount) in a data save service (online storage); a file name of a file saved thereto, the date and time of the latest access; and a fee in charge-per-use. The use of the cloud services shown in the usage information 70 includes using the cloud service through the information system 1, and using the cloud service without the information system 1, e.g., using the cloud service by the user who directly uploads data from a mobile terminal outside the company.

The selection setting information 80 shows operating conditions set for the selection portion 104 described later. The selection setting information 80 is registered, for example, by an administrator of the information system 1.

In addition to management of the foregoing information, the information managing portion 102 gets involved in inputting/outputting, from/to the storage 28, data exchanged between the cloud 30 (having the cloud servers 31, 32, 33, and 34) and the MFP 2. In a job of saving the scan image 41 to the cloud 30, the information managing portion 102 stores the scan image 41 temporarily to the storage 28, and then conveys the scan image 41 to the transfer processing portion 114. In a job of printing a document saved in the cloud 30, the information managing portion 102 stores a document 42 transferred from the cloud 30 temporarily to the storage 28, and then conveys the document 42 to the print processing portion 112.

The obtaining portion 103 obtains the usage information 70 from the cloud 30. For example, when the user 9 logs into the information system 1, the obtaining portion 103 uses data in the account information 60 corresponding to the user 9 to gain access to the cloud servers 31, 32, 33, and 34 for each of which the user 9 has an account, so that information on the use by the user 9 is obtained from the cloud servers 31, 32, 33, and 34. The information obtained by the obtaining portion 103 is managed as the usage information 70 by the information managing portion 102.

The selection portion 104 selects, from among the cloud servers 31, 32, 33, and 34 corresponding to the user 9, a cloud server recommended the user 9 to use. The selection is made at a time when the user 9 performs input operation to use the cloud 30. The selection portion 104 obtains the usage information 70 and the selection setting information 80 through the information managing portion 102. The selection portion 104 then selects, under the set operating conditions, at least one cloud server in accordance with the use of the cloud servers 31, 32, 33, and 34 by the user 9. For example, in the case where the use of the cloud servers 31, 32, 33, and 34 is subjected to fees, the selection portion 104 selects, based on the price scheme information 50 and the usage information 70, a cloud server in which the amount of increase due to a new use is the least. The result of selection by the selection portion 104 is informed to the user interface portion 101, and is displayed by the user interface portion 101.

The cooperative processing portion 105 serves to give a command to the cloud servers getting involved in cooperative processing designated by the user. For example, the cooperative processing portion 105 instructs the first cloud server and the second cloud server to perform cooperative processing of updating, by the second cloud server, a file saved in the first cloud server. If the second cloud server cannot gain access to the first cloud server, then the cooperative processing portion 105 obtains the update target file from the first cloud server to transfer the update target file to the second cloud server or a storage to which the second cloud server is accessible, and then the second cloud server is caused to update the target file. The storage used in this situation may be the storage 28 of the MFP 2, or another memory device of the server 5 or another device on the LAN 6.

The print processing portion 112 serves to cause the printer engine 23 to print out the document 42 transferred from the cloud 30 to the MFP 2. When receiving a print command by the user 9 via the user interface portion 101, the print processing portion 112 conveys the document 42 obtained through the information managing portion 102 to a printer controller (not shown). The printer controller converts the document 42 into raster image data, and the resultant is printed by the printer engine 23.

The transfer processing portion 114 serves to perform processing for transferring the scan image 41 or another file to the cloud 30. When receiving a transfer command by the user 9 via the user interface portion 101, the transfer processing portion 114 sends the transfer target data obtained via the information managing portion 102 to the communication interface 25. Upon transferring the file, the transfer processing portion 114 adapts the file to the transfer destination if necessary. For example, the transfer processing portion 114 changes the extension of the file or changes the file format.

FIG. 4 shows an example of a price information table T50 for managing the price scheme information 50. The price information table T50 shows, for each cloud service, a service class, a charge per use, and a basic charge to acquire an account. In the illustrated example, as for the cloud service A, the following is shown: the service class is data save (online storage); the default storage capacity is set at 5 GB; the capacity can be increased up to 50 GB; monthly fee (unit price) per 1 GB is 100 yen; and so on. As for the cloud service B, the following is shown: the service class is application-offering; the default storage capacity is set at 1 GB; the capacity can be increased up to 20 GB; the unit price is 500 yen; and so on.

FIG. 5 shows an example of a communication specification table T51 for communication with the cloud servers. The communication specification table T51 manages, for each cloud service, software used for communication, a protocol, a suitable file format.

FIG. 6 shows an example of a cooperation pattern table T52 in which communication patterns between the cloud servers are centralized. The cooperation pattern table T52 shows whether or not each of the cloud services is allowed to obtain access to a box 29 of the MFP 2, to the server 5 (in-house server) on the LAN 6, and to another cloud server. In the cooperation pattern table T52, "direct" means that the corresponding cloud service is allowed to gain access, and "indirect" means that the MFP 2 to which two devices are accessible is necessary for communication between the two devices.

FIG. 7 shows a user-specific account management table T60 in which the account information 60 is managed. The user-specific account management table T60 shows, for each of the users registered in the information system 1, user names (ID) and passwords corresponding to accounts given to the corresponding user. Further, default directories designated by the corresponding user are shown on an account-by-account basis. The default directory is information based on which a directory to be initially displayed is determined at the time of displaying the use of cloud services by each of the users.

FIG. 8 shows an example of a priority table T81 in which the selection setting information 80 is managed. According to the information system 1, it is possible for the user or the administrator to set priority items in advance in order for the selection portion 104 to select a cloud service recommended the user to use. The priority items and the priority order thereof are managed in the priority table T81. In the example of FIG. 8, the priority items are "cost" and "speed", and "cost" is given the top priority and "speed" is the second top priority. For setting the priority order, a supplementary information table T82 shown in FIG. 9 is used as reference information.

FIG. 10 shows an example of an option setting table T83 used for file move in which at least one cloud server gets involved. In the information system 1, any one of three modes can be selected as processing modes for the case where a file in a cloud server has to be moved to another cloud server or a storage on the LAN 6. The three modes are: a first mode in which the file is automatically moved without giving any information to the user; a second mode in which after the user is informed of a move of the file, the file is automatically moved; and a third mode in which the file is moved after informing the user of the move and waiting for the user to acknowledge the move. In FIG. 10, the third mode is selected.

Figure 11:
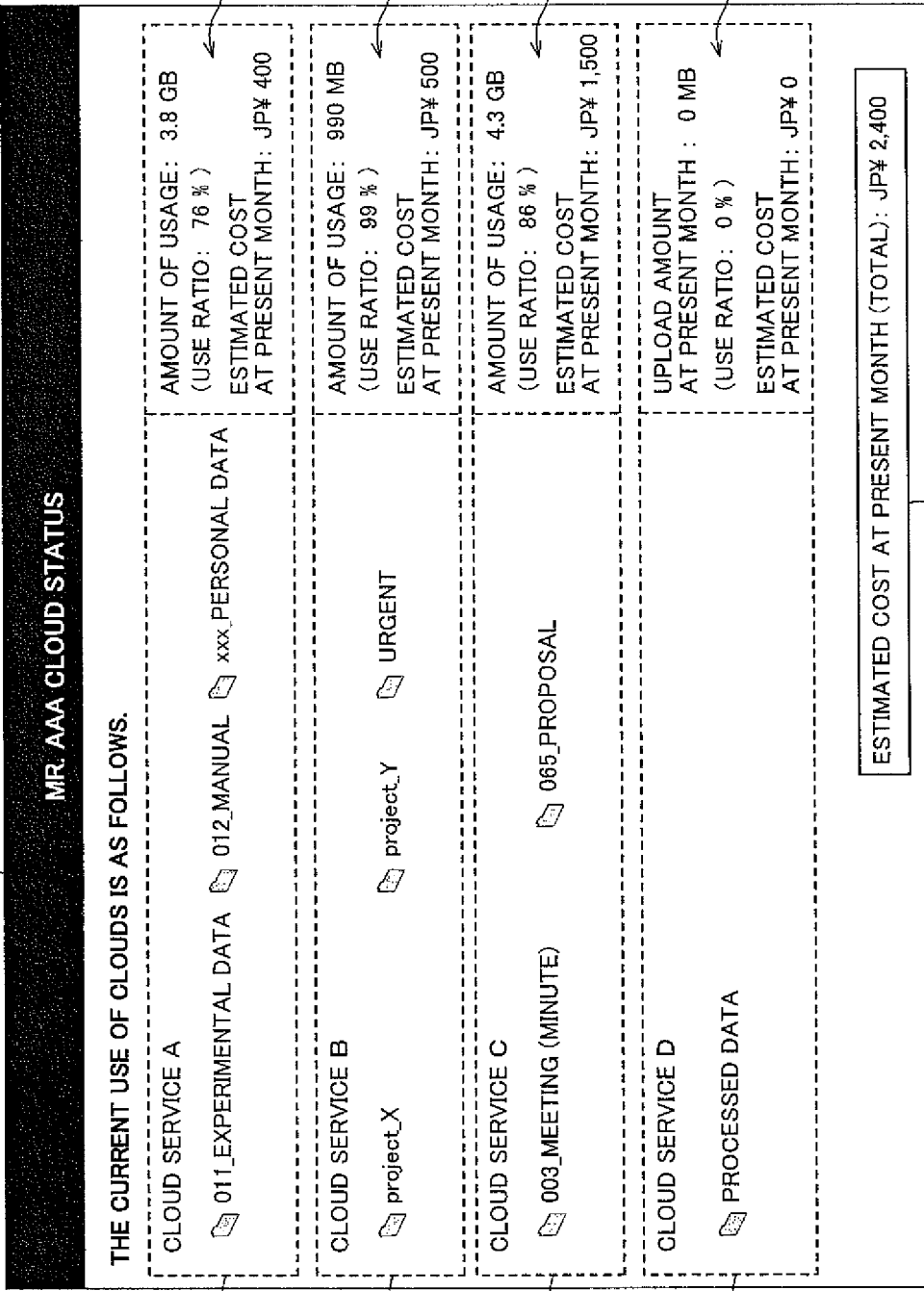
FIG. 11 is a diagram showing an example of a list in which use of cloud servers is shown.

FIG. 11 shows an example of a list in which use of the cloud servers is shown. Referring to FIG. 11, a cloud status screen Q20 is shown in which the use of the clouds by the user 9 (Mr./Ms. AAA) is shown. The cloud status screen Q20 has four fields 711, 721, 731, and 741 corresponding to four cloud services for which the user 9 is given accounts. The fields 711, 721, 731, and 741 are provided in the up-down direction of the cloud status screen Q20. In each of the fields 711, 721, 731, and 741, the name of a folder provided by the user 9 in the corresponding cloud server, and numerical information 712, 722, 732, and 742 related to usage fee are displayed.

Each piece of the numerical information 712, 722, 732, and 742 shows an amount of usage for data save, a use ratio of the amount of usage to a storage capacity provided by the cloud service, and an estimated cost at present month in the current billing. When data on use ratio and estimated cost at present month cannot be obtained from the cloud server, the information system 1 calculates the same based on the amount of usage obtained from the cloud server and the price information table T50.

The cloud status screen Q20 has a field 751 at the bottom. In the field 751, the total of estimated costs in the cloud server-specific numerical information 712, 722, 732, and 742 is displayed as "estimated cost at present month". The estimated cost at present month is calculated by the information system 1.

Through the cloud status screen Q20, the user 9 knows the use of the cloud services by himself/herself at one time. To be specific, the user 9 knows which cloud server has a desired folder, or compares an amount of usage in a cloud service with an amount of usage in another cloud service without his/her efforts in logging into the cloud servers separately. The user 9 knows easily a usage fee of each of the cloud services and a total amount thereof.

The description goes onto the operation by the information system 1 for the case where the user designates a job and the job is executed by taking an example of a job in which the MFP 2 and at least one cloud server gets involved. The exemplified job is a job that "the MFP 2 reads out an image from a document sheet to create a scan data file, and the scan data file is bound into an existing file in the cloud server". This job is called a "scan-to-cloud-and-bind" job. The format of the scan data file and the existing file is, for example, Portable Document Format (PDF).

Figure 12:
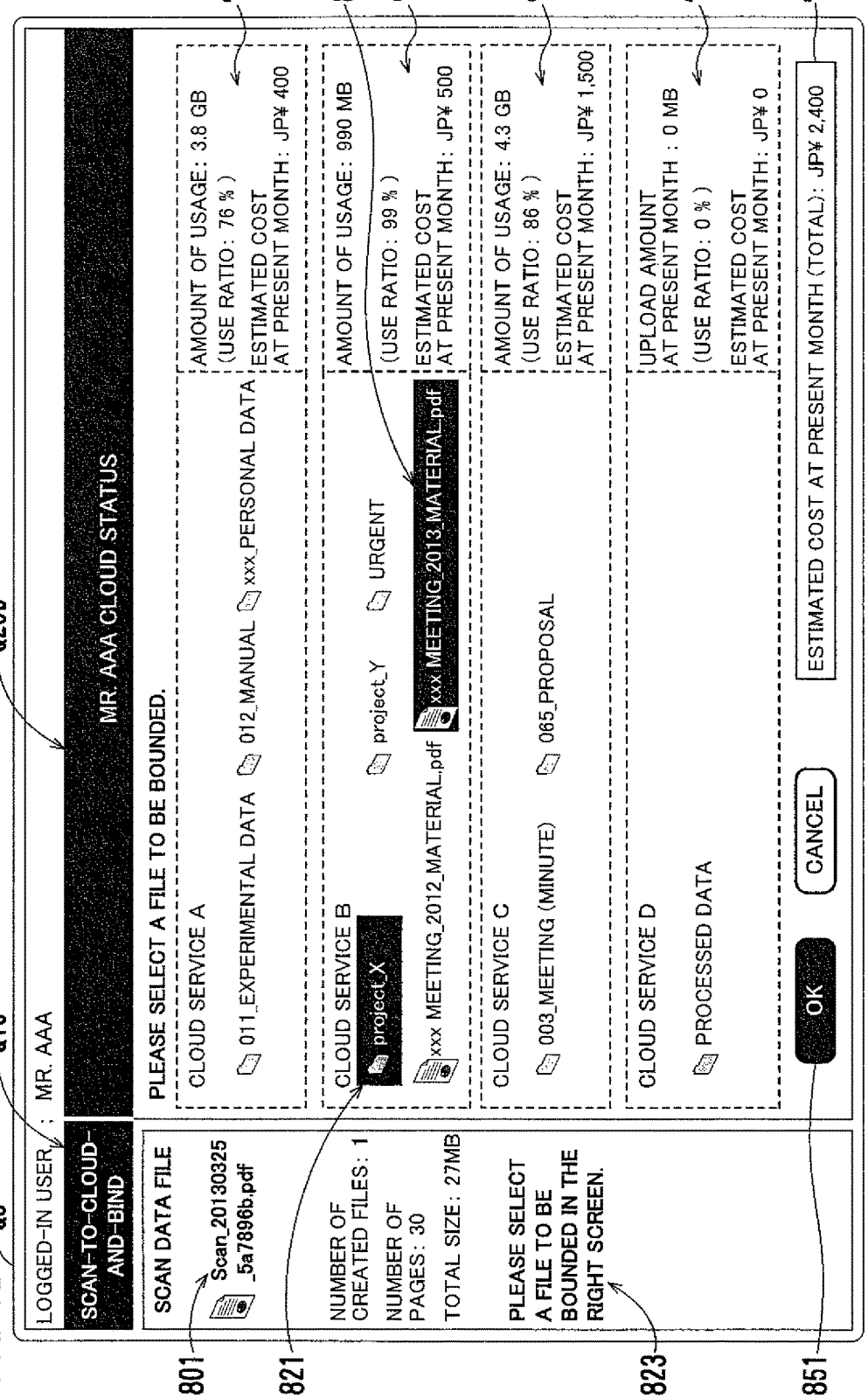
FIG. 12 is a diagram showing an example of an operating screen displayed for the case where a file is transferred to a cloud server.

An operating screen Q5 shown in FIG. 12 appears at a time when the user designates a file into which the created scan data file is to be bound. The operating screen Q5 has a general-purpose screen Q10 and a cloud status screen Q20b which are sub-screens. The general-purpose screen Q10 shows a file name 801 automatically given to the scan data file, a message 823 prompting the user to select the file into which the created scan data file is to be bound, and so on.

As with the cloud status screen Q20 shown in FIG. 11, the cloud status screen Q20b of FIG. 12 displays the use by the user 9, and the state of the file selection by the user 9. In the example of FIG. 12, the folder name 821 of "project_X" in the cloud service B and the file name 825 of "xxx meeting_2013_material.pdf" are highlighted by inversion of background color. Stated differently, FIG. 12 shows that the file (xxx meeting_2013_material.pdf) of the folder (project_X) is selected. In this state, when the user 9 touches an OK button 851 (clicks the same in mouse operation, and the same is true hereinafter), the file into which the created scan data file is to be bound is determined temporarily.

When the file into which the created scan data file is to be bound is determined, a cloud server to which the scan data file is to be transferred is also determined. In the example of FIG. 12, the transfer destination is the cloud server 32 (see FIG. 1) of the cloud service B. The information system 1 determines whether or not transfer to the cloud server 32 is appropriate by using, as determination conditions, a cost that is the top priority item indicated in the priority table T81. To be specific, if the transfer to the cloud server 32 does not incur any additional charge, or, alternatively, if the transfer to the cloud server 32 is cheaper than the transfer to another cloud server, then the information system 1 determines that the transfer to the cloud server 32 is appropriate. Otherwise, the information system 1 determines that the transfer to the cloud server 32 is not appropriate. If determining that the transfer to the cloud server 32 is appropriate, then the information system 1 uses the file determined temporarily as the file into which the scan data file is to be bound, transfers the scan data file to the cloud server 32, and causes the cloud server 32 to perform the bind processing.

Figure 13:
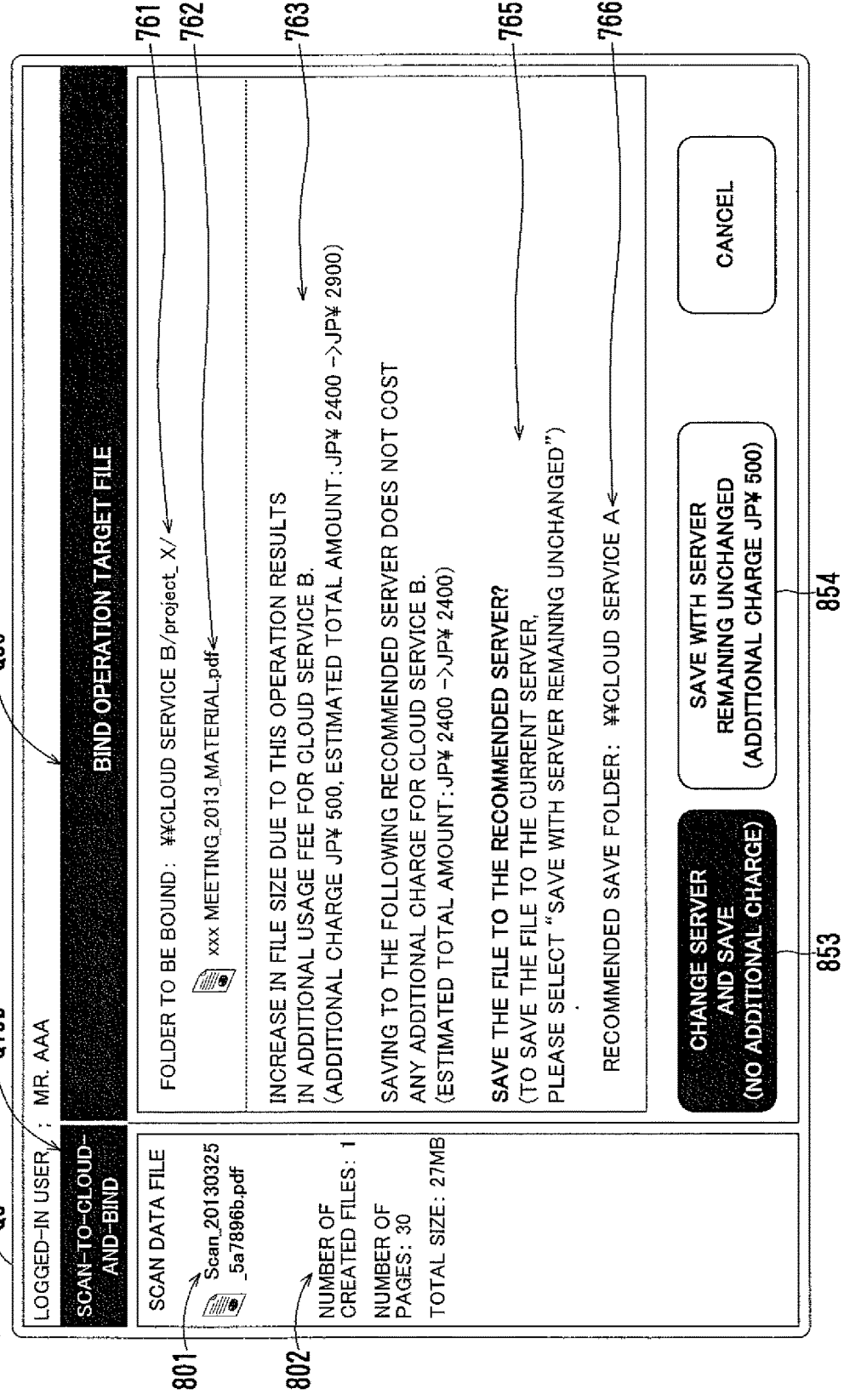
FIG. 13 is a diagram showing an example of an operating screen displaying a selection result of a cloud server by an information system.

An operating screen Q6 shown in FIG. 13 is displayed for the case where transfer to the cloud server 32 selected by the user 9 is determined to be not appropriate. The operating screen Q6 has a general-purpose screen Q10b and a guide screen Q30 which are sub-screens. The general-purpose screen Q10b shows the file name 801 of the scan data file and other information 802 on the scan data file. The guide screen Q30 displays a transfer destination directory 761 determined temporarily, a file name 762 of the bound destination file determined temporarily, a message 763 informing the user 9 of increase in fee, a message 765 prompting the user 9 to determine whether or not to change the transfer destination, a name 766 of a cloud service recommended the user 9 to use, and so on.

To be specific, it is assumed that the amount of data of the scan data file is 27 MB as shown in the information 802 on the general-purpose screen Q10b. If the scan data file is transferred to the cloud service B in the state where the amount of usage of the cloud service B is 990 MB as shown in the numerical information 722 of FIG. 12, then the amount of usage eventually exceeds 1 GB which is the default storage capacity of the cloud service B (see FIG. 4). If the amount of usage exceeds 1 GB, an additional charge of 500 yen costs the user 9. This is informed to the user 9 through the message 763. While the transfer to the cloud service B increases the usage fee, the transfer to the cloud service A does not increase the usage fee. In view of this, through the display of the guide screen Q30, the user 9 is recommended to use the cloud service A.

The guide screen Q30 has, its bottom, two buttons 853 and 854 for the user 9 to enter his/her decision result. If the user 9 decides to change the transfer destination of the scan data file as per the recommendation by the information system 1, then he/she touches the button 853. If the user 9 decides not to change the transfer destination, then he/she touches the button 854. In response to the operation of touching the button 853 or the button 854, the transfer destination of the scan data file is confirmed. Then, of the job (scan-to-cloud-and-bind), the file transfer and binding are performed.

In the foregoing scan-to-cloud-and-bind job, basically, the MFP 2 and a single cloud server work in coordination with each other. Aside from the job, there is a job in which a plurality of cloud servers gets involved. The information system 1 supports the mutual cooperation between the cloud servers.

Figure 14:
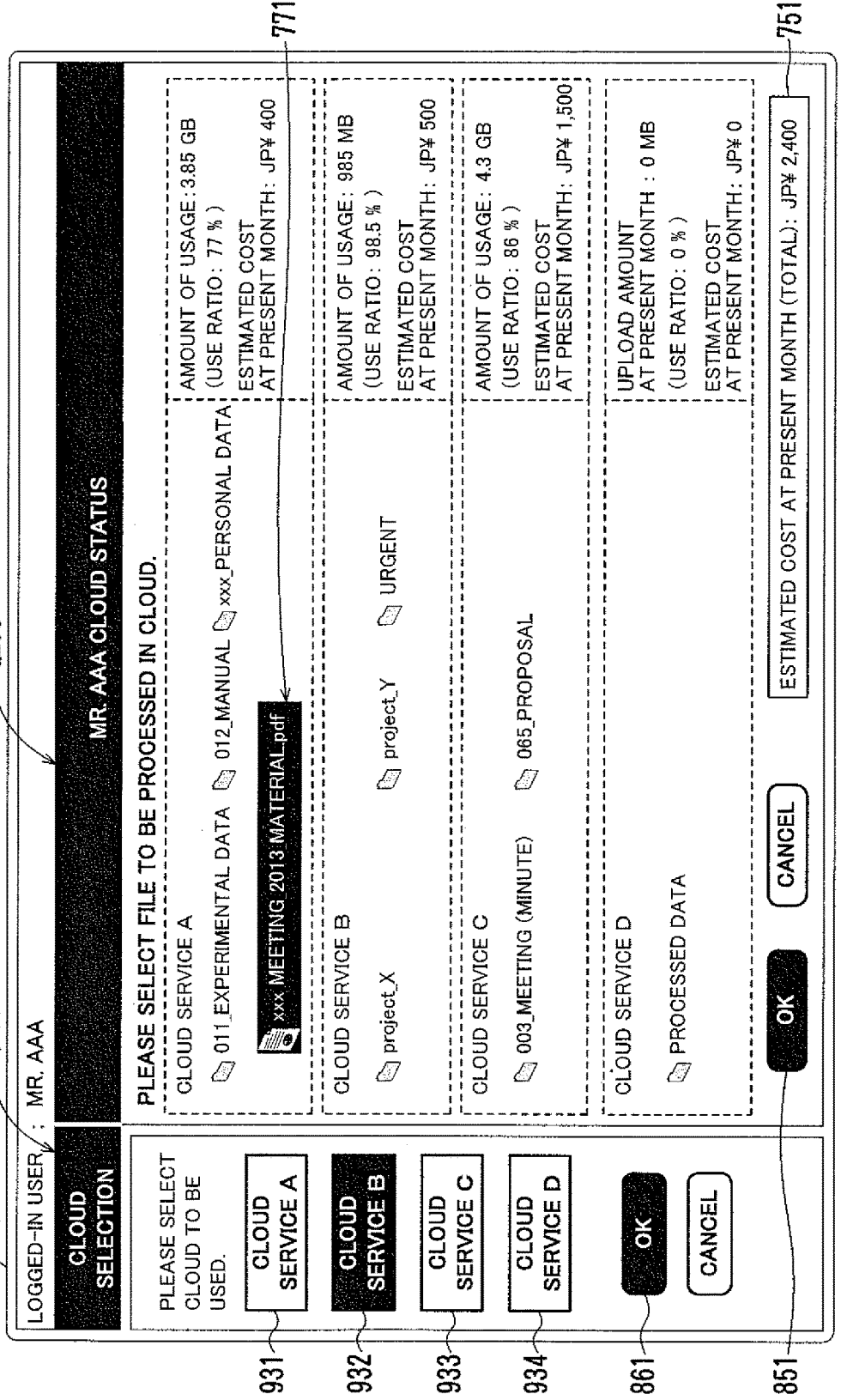
FIG. 14 is a diagram showing an example of an operating screen for making settings of cooperative processing in which a plurality of cloud servers gets involved.

FIG. 14 is a diagram showing an example of an operating screen for making settings of cooperative processing in which a plurality of cloud servers gets involved. An operating screen Q7 of FIG. 14 appears for the case where the user 9 performs predetermined input operation to designate cooperative processing of updating a file saved in the first cloud server by the first cloud server or the second cloud server. The operating screen Q7 has a general-purpose screen Q10c and a cloud status screen Q20c which are sub-screens.

The general-purpose screen Q10c has select buttons 931, 932, 933, and 934 corresponding to the cloud services for each of which the user 9 has an account. The user 9 touches any one of the select buttons 931, 932, 933, and 934 to select the second cloud server which is to update the file.

However, of the select buttons 931, 932, 933, and 934, a select button corresponding to a cloud service which does not provide a file update service is not available for selection, and such a button is grayed out. In this example, since only the cloud service B provides an application for file update as shown in FIG. 4, the other three cloud services are not available for selection. The cloud service B is therefore selected automatically, and the select button 932 corresponding to the cloud service B is highlighted. In response to the touch by the user 9 onto the OK button 861, selection of the cloud service B is confirmed.

As with the cloud status screen Q20 shown in FIG. 11, the cloud status screen Q20c of FIG. 14 displays the use by the user 9, and the state of the selection of the update target file. In the illustrated example, the file name 825 of "xxx meeting_2013_material.pdf" in the cloud service A is highlighted. Stated differently, FIG. 14 shows that the file (xxx meeting_2013_material.pdf) is selected. In this state, when the user 9 touches the OK button 851, the selection of the update target file is confirmed.

Figure 15:
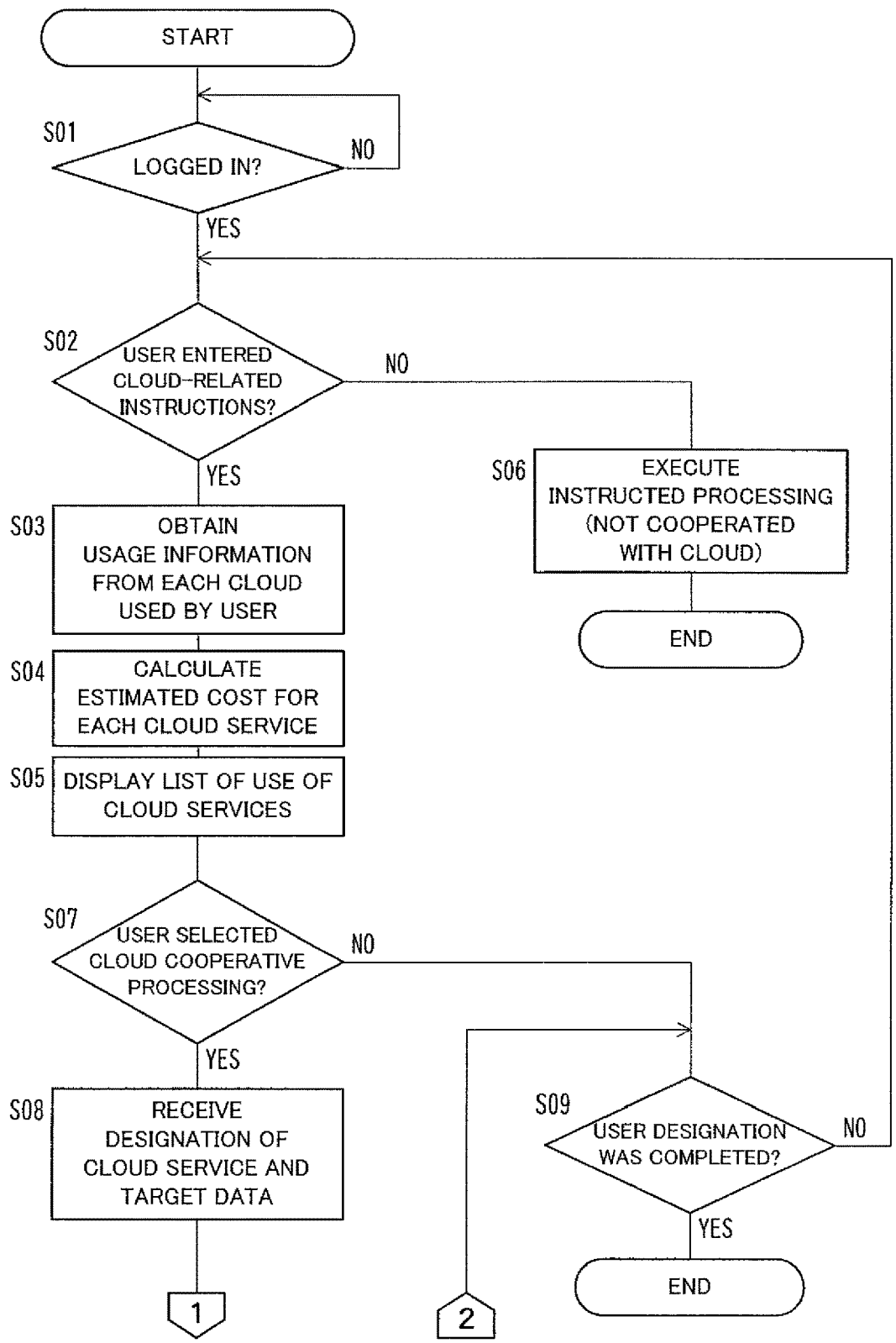
FIG. 15 is a flowchart depicting a first part of the flow of operation by an information system.
Figure 16:
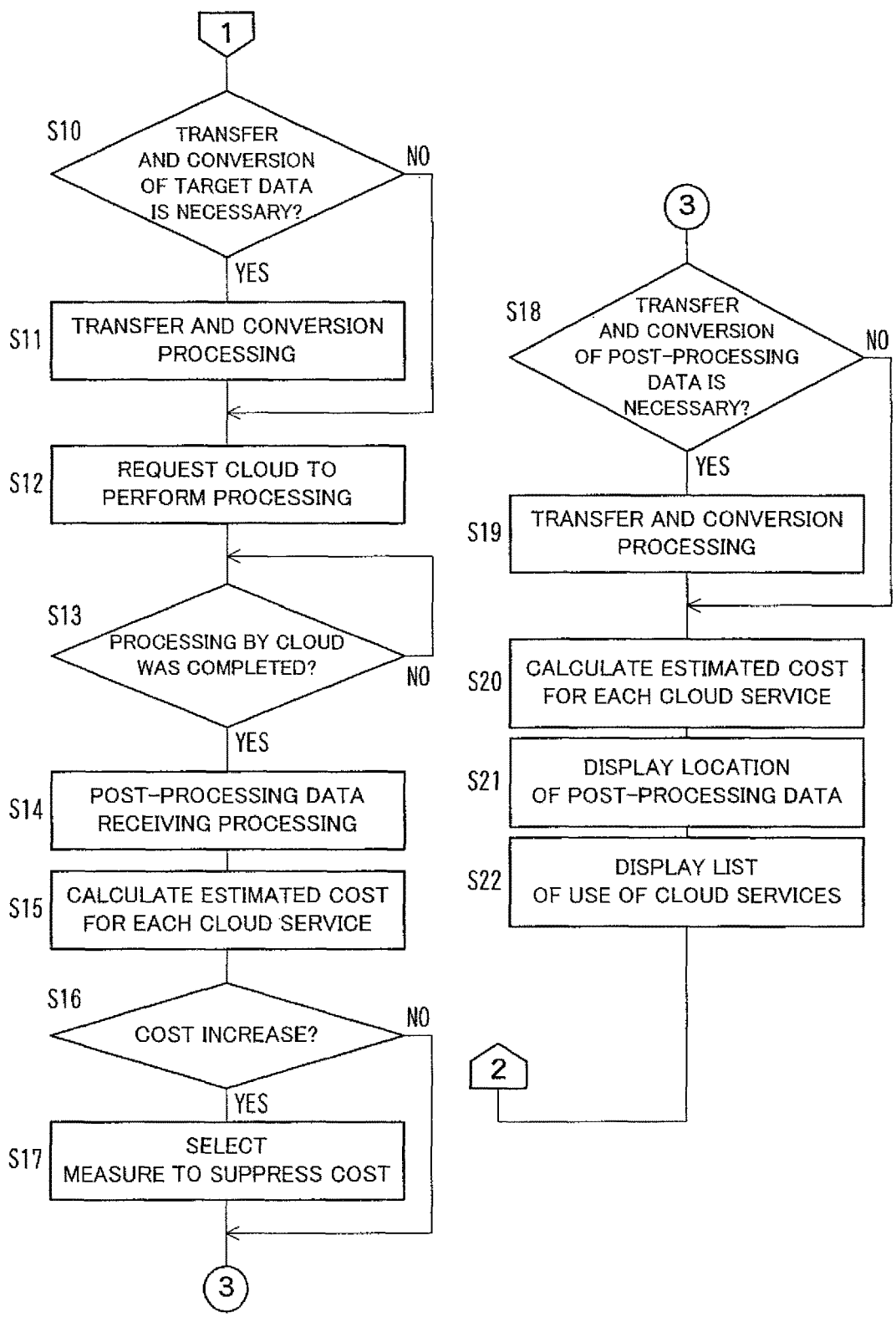
FIG. 16 is a flowchart depicting a second part of the flow of operation by an information system.

FIGS. 15 and 16 are flowcharts depicting the foregoing operation by the information system 1.

Referring to FIG. 15, the information system 1 waits for a user to log thereinto (Step S01), and performs processing in accordance with instructions entered by the logged-in user. When the instructions entered by the logged-in user are not cloud-related instructions, the process goes to Step S06 in which processing is performed based on the instructions.

If the user enters cloud-related instructions (Yes in Step S02), e.g., if the user selects an operation mode in which the MFP 2 and a cloud work in coordination with each other, or, if the user gives a command to display the use of the clouds, then the information system 1 obtains usage information from each of the cloud servers for which the user is given an account (Step S03). The information system 1 performs, based on the usage information obtained, estimated cost calculation to calculate an estimated cost at present month for each cloud service and a total of the estimated costs (Step S04). The information system 1 displays a list of the use of the cloud services (Step S05).

If the operation mode is selected (Yes in Step S07), then the information system 1 receives designation of a cloud service or designation of processing target data (Step S08). If instructions other than the selection of the operation mode are entered (No in Step S07), then the information system 1 finishes the processing (Yes in Step S09), provided that the entered instructions correspond to operation of completing the input. Otherwise, the process goes back to step S02 and performs processing in accordance with the subsequent designation.

Referring to FIG. 16, the information system 1 checks, for the target data designated by the user, whether or not it is necessary to transfer the target data between the cloud servers or between the MFP 2 and the cloud, and whether or not it is necessary to convert the file format (Step S10). In accordance with the check result, the information system 1 transfers or converts the target data (Step S11). The transfer may be move with the data not remained on the transfer source, or may be duplicate of making, in the transfer source, a shortcut to the transfer destination.

The information system 1 requests the cloud server selected (or recommended to use and approved) by the user to perform processing (Step S12). At this time, the information system 1 informs the cloud server where the processing target data is located. The processing target data is sometimes saved in a cloud server other than the cloud server which is to perform the processing, in the box 29 of the MFP 2, or in the server 5. When the processing target data is saved in a location other than the cloud server which is to perform the processing, the information system 1 informs the cloud server which is to perform the processing of account information necessary to gain access to the data.

When the cloud server completes the processing (Yes in Step S13), the information system 1 performs processing of receiving post-processing data or confirming the storage location (Step S14). The information system 1 then performs estimated cost calculation for each of the cloud services (Step S15). If the usage fee is increased (Yes in Step S16), then the information system 1 selects a measure to suppress the increase in cost, e.g., change of the save location of the post-processing data (Step S17).

The information system 1 checks whether it is necessary to perform at least one of transfer of the post-processing data and conversion of the post-processing data, or perform both thereof (Step S18), and performs necessary processing accordingly (Step S19). The information system 1 then performs estimated cost calculation for each of the cloud services (Step S20). The information system 1 displays a location of the post-processing data and displays a list of the use of the cloud services (Steps S21 and S22).

According to the foregoing embodiments, in using different cloud services provided by different providers, the user can save data to a cloud where the cost is lowest without checking the charge state of each of the cloud services. Since the file format is automatically converted as needed, the user can use the cloud services seamlessly. For execution of cooperative processing in which a plurality of cloud services gets involved, the user is not required to enter account IDs and passwords for the cloud services separately.

In the foregoing embodiments, the example is described in which the information system 1 is provided in the MFP 2. The present invention is not limited thereto. For example, in a configuration where an authentication server on the LAN 6 relays an access request from the MFP 2 to a cloud server, the authentication server may be provided with the functions of the information system 1. Instead of the configuration in which the entirety of the information system 1 is incorporated into a single information device, the functional elements of the information system 1 may be incorporated separately into different information devices. For example, the following configuration is possible: the managing portion 102 for managing account information is provided in the authentication server; the obtaining portion 103 for obtaining the usage information is provided in the MFP 2; and the user interface portion 101 for displaying a list of use is incorporated into a mobile terminal operated by a user.

In the foregoing embodiments, when a file is moved or a new file is saved, a file may be divided into plural parts and be distributed to different cloud servers in order to suppress the increase in usage fee of clouds.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An information system performing communications with plurality of cloud servers on an internet, the information system comprising:
   a memory that stores instructions; and
   a central processing unit (CPU), connected to the memory, that executes the instructions to cause the information system to:
   manage account information indicating accounts of a user of the information system, the accounts being set up for the cloud servers;
   in response to operation of logging into the information system by the user, gain access to the cloud servers with the account information to obtain, from each of the cloud servers, usage information that indicates functions and statuses of use of the plurality of the cloud servers that the user may invoke; and
   cause a display provided in a device operated by the user in order to log into the information system to display a file name of a file to be transferred to one of the cloud servers and a list of the statuses of use of the respective cloud servers by the user who has logged into the information system, when the file is created.

2. The information system according to claim 1, wherein the CPU executes the instructions to cause the information system further to:
   in response to input operation, by the user, for using at least one of the cloud servers newly, select a cloud server that is recommended to be used by the user from among the cloud servers depending on the statuses of use of the respective cloud servers by the user; and
   display a result of the selection.

3. The information system according to claim 2, wherein the CPU executes the instructions to cause the information system further to:
   manage price setting information indicating how to calculate usage fees of the respective cloud servers, and
   select, from among the cloud servers, as the cloud server that is recommended to be used by the user, a cloud server in which an amount of increase in a usage fee due to the new use is the least based on the price setting information and the usage information.

4. The information system according to claim 2, wherein the CPU executes the instructions to cause the information system further to cause, in accordance with a command given by the user, a first cloud server and a second cloud server of the cloud servers to perform cooperative processing of updating, by the second cloud server, a file saved in the first cloud server.

5. The information system according to claim 4, wherein, prior to execution of the cooperative processing, the CPU executes the instructions to cause the information system to select, from among the cloud servers, as the cloud server that is recommended to be used by the user, a cloud server in which the file can be updated and an amount of increase in a usage fee due to the cooperative processing is the least.

6. The information system according to claim 4, wherein, if the second cloud server is not capable of gaining access to the first cloud server, the CPU executes the instructions to cause the information system to transfer the file to the second cloud server or a storage to which the second cloud server is capable of gaining access, and causes the second cloud server to update the file.

7. The information system according to claim 1, wherein the CPU, when a file is transferred to any one of the cloud servers, executes the instructions to cause the information system to adapt the file to a transfer destination if necessary.

8. A multi-functional information device that performs network communication, the multi-functional information device comprising:
   the information system according to claim 1;
   an image scanner that reads an image from a document sheet;
   a printer engine that prints the image onto paper;
   a storage that stores data; and
   an operating panel provided with the display;
   wherein the CPU transfers image data obtained by the image scanner or a document stored in the storage to a cloud server selected from among the cloud servers via the operating panel by the user who is also a user of the multi-functional information device; and
   the CPU causes the printer engine to print a document transferred from any one of the cloud servers.

9. A method for supporting a use of a cloud service, the method comprising:
   managing, by an information system performing communication with a plurality of cloud servers on an internet that provide a cloud service, account information indicating accounts of a user of the information system, the accounts being set up for the cloud servers;
   in response to operation of logging into the information system by the user, gaining, by the information system, access to the cloud servers with the account information to obtain, from each of the cloud servers, usage information that indicates functions and statuses of use of the plurality of the cloud servers that the user may invoke; and
   causing, by the information system, a display provided in a device operated by the user in order to log into the information system to display a file name of a file to be transferred to one of the cloud servers and a list of the statuses of use of the respective cloud servers by the user who has logged into the information system, when the file is created.

10. The method according to claim 9, comprising
   in response to input operation, by the user, for using at least one of the cloud servers newly, selecting, by the information system, a cloud server that is recommended to be used by the user from among the cloud servers depending on the statuses of use of the respective cloud servers by the user, and
   displaying, by the information system, a result of selection on the display.

11. The method according to claim 10, comprising
managing, by the information system, price setting information indicating how to calculate usage fees of the respective cloud servers, and
selecting, by the information system, from among the cloud servers, as the cloud server that is recommended to be used by the user, a cloud server in which an amount of increase in a usage fee due to the new use is the least based on the price setting information and the usage information.

12. The method according to claim 10, comprising causing, by the information system, a first cloud server and a second cloud server of the cloud servers to perform cooperative processing of updating, by the second cloud server, a file saved in the first cloud server.

13. The method according to claim 12, comprising, prior to execution of the cooperative processing, selecting, by the information system, from among the cloud servers, as the cloud server that is recommended to be used by the user, a cloud server in which the file can be updated and an amount of increase in a usage fee due to the cooperative processing is the least.

14. The method according to claim 12, further comprising, if the second cloud server is not capable of gaining access to the first cloud server, transferring, by the information system, the file to the second cloud server or a storage to which the second cloud server is capable of gaining access, and causes the second cloud server to update the file.

15. The method according to claim 9, further comprising, when a file is transferred to any one of the cloud servers, adapting, by the information system, the file to a transfer destination if necessary.

16. The method according to claim 9, wherein a part of the information system is provided in a first information device, and another part of the information system is provided in a second information device capable of performing communication with the first information device.

17. The method according to claim 9, wherein
the information system is provided in a multifunctional information device capable of performing network communication and including an image scanner that reads an image from a document sheet, a printer engine that prints the image onto paper, a storage that stores data thereinto, and an operating panel provided with the display, and
the user is also a user of the multifunctional information device.

18. A non-transitory computer-readable storage medium storing thereon a computer program executed in a system performing communication with a plurality of cloud servers on an internet, the computer program causing a computer to perform processes comprising:
management processing of managing account information indicating accounts of a user of the system, the accounts being set up for the cloud servers;
obtaining processing of, in response to operation of logging into the system by the user, gaining access to the cloud servers with the account information to obtain, from each of the cloud servers, usage information that indicates functions and statuses of use of the plurality of the cloud servers that the user may invoke; and
display processing of causing a display provided in a device operated by the user in order to log into the system to display a file name of a file to be transferred to one of the cloud servers and a list of the statuses of use of the respective cloud servers by the user who has logged into the information system, when the file is created.

19. The non-transitory computer-readable storage medium according to claim 18, wherein
in response to input operation, by the user, for using at least one of the cloud servers newly, the computer program further causes the computer to perform selection processing of selecting a cloud server that is recommended to be used by the user from among the cloud servers depending on the statuses of use of the respective cloud servers by the user; wherein
the display processing is to display a result of selection in the selection processing on the display after the list is displayed.

20. The non-transitory computer-readable storage medium according to claim 19, wherein
the management processing is to manage the account information and price setting information indicating how to calculate usage fees of the respective cloud servers, and
the selection processing is to select, from among the cloud servers, as the cloud server that is recommended to be used by the user, a cloud server in which an amount of increase in a usage fee due to the new use is the least based on the price setting information and the usage information.

21. The non-transitory computer-readable storage medium according to claim 19, wherein the computer program causes the computer to further perform, in accordance with a command given by the user, cooperative processing of causing a first cloud server and a second cloud server of the cloud servers to update, by the second cloud server, a file saved in the first cloud server.

22. The non-transitory computer-readable storage medium according to claim 21, wherein the selection processing includes, prior to execution of the cooperative processing, selecting, from among the cloud servers, as the cloud server that is recommended to be used by the user, a cloud server in which the file can be updated and an amount of increase in a usage fee due to the cooperative processing is the least.

23. The non-transitory computer-readable storage medium according to claim 21, wherein, if the second cloud server is not capable of gaining access to the first cloud server, the cooperative processing includes transferring the file to the second cloud server or a storage to which the second cloud server is capable of gaining access, and causing the second cloud server to update the file.

24. The non-transitory computer-readable storage medium according to claim 18, wherein the computer program causes the computer to further perform processing of, when a file is transferred to any one of the cloud servers, adapting the file to a transfer destination if necessary.

25. The non-transitory computer-readable storage medium according to claim 18, wherein
the computer program causes a computer provided as the computer in a multi-functional information device capable of performing network communication to perform the management processing, the obtaining processing, the display processing, transfer processing, and print processing,
the multi-functional information device includes an image scanner that reads an image from a document sheet,
a printer engine that prints the image onto paper,
a storage that stores data thereinto, and
an operating panel provided with a display, the transfer processing includes transferring image data obtained by the image scanner or a document stored in the storage to a cloud server selected from among the cloud servers via the operating panel by the user who is also a user of the multi-functional information device, and the print processing includes causing the printer engine to print a document transferred from any one of the cloud servers.

* * * * *